July 17, 1951 J. O. HARDIN, JR 2,561,114
FRONT WHEEL MOUNTING FOR TRACTORS
Filed Oct. 14, 1949 4 Sheets-Sheet 3

JOSEPH O. HARDIN, Jr.
INVENTOR.

BY
ATTORNEY

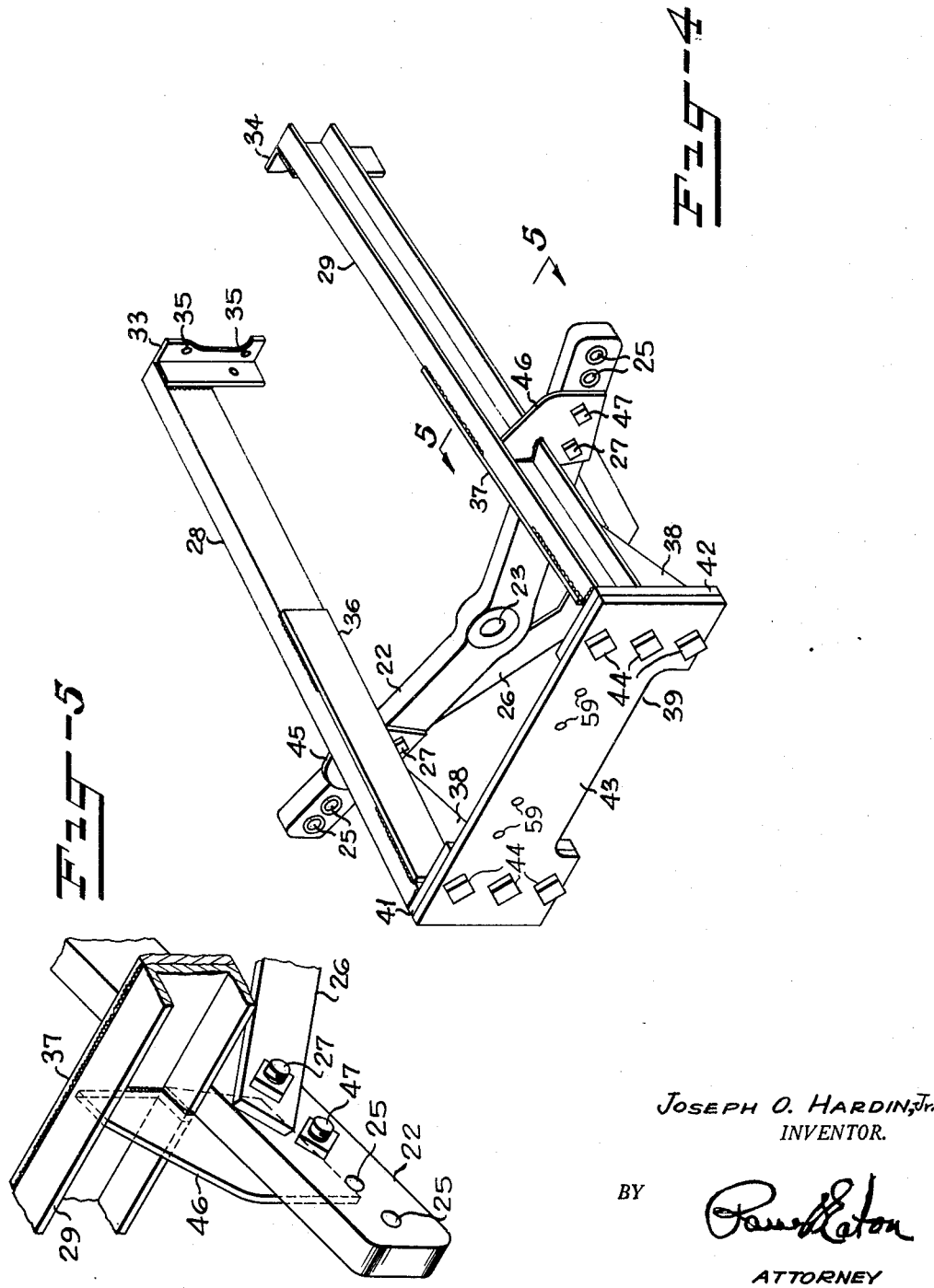

Patented July 17, 1951

2,561,114

UNITED STATES PATENT OFFICE 2,561,114

FRONT WHEEL MOUNTING FOR TRACTORS

Joseph O. Hardin, Jr., Shelby, N. C.

Application October 14, 1949, Serial No. 121,419

4 Claims. (Cl. 280—87)

This invention relates to a means for mounting closely spaced front wheels on a conventional tractor of the type having conventional rear wheels and having a front axle pivotally disposed on the frame thereof and diverging outwardly therefrom and having widely spaced front wheels thereon. I have provided a frame secured to the front portion of the tractor whereby the widely spaced wheels may be removed from the axle and a front wheel assembly having closely spaced front wheels thereon may be mounted on the front end of the frame, thus leaving the ends of the front axle free to permit earth working implements, such as plows, cultivators, and the like, to be attached thereto so that the cultivators and the like will be disposed in the line of view of an operator facing the front of the tractor.

It is well known that some conventional tractors are provided with a front wheel assembly having two closely spaced front wheels mounted thereon and other conventional tractors have a front axle pivotally mounted thereon and have widely spaced front wheels mounted on the opposed ends of the front axle and in this latter instance, all earth working implements which are desired to be mounted on the tractor are usually mounted on the rear draw bar of the tractor and connected to the hydraulic lift of the tractor. If cultivators are attached on each side of a tractor having widely spaced front wheels, the radius of turning of the tractor is greatly increased since the front wheels will engage the cultivators in turning. Obviously, when attachments are mounted at the rear of a tractor, the operator of the tractor must look backwardly in order to observe the path of travel of the implements. This, of course, makes it difficult to guide the tractor in a proper manner.

It is, therefore, an object of this invention to provide a wheel support frame which can readily be secured to the front end of a type of tractor having widely spaced front wheels, so that a conventional front wheel assembly of closely spaced wheels may be mounted on the wheel support frame, thus leaving the opposed ends of the conventional front axle on the tractor free so that suitable earth working implements may be secured thereto.

It is another object of this invention to provide a wheel support frame comprising a pair of horizontally disposed bars, such as channel bars, disposed one on each side of the front portion of a tractor and being secured at their rear ends to the chassis of the tractor and extending to a point in front of the tractor and having on the channel bars a transverse bar secured to the front ends thereof so that a conventional front wheel assembly may be mounted on the transverse bar extending between the channel bars.

It is another object of this invention to provide means extending beneath and secured to the chassis of the tractor and connected to the front axle to secure the front axle of the tractor against pivotal movement with the tractor.

Some of the objects of the invention having been stated, other objects will appear as the description proceeds, when taken in connection with the accompanying drawings, in which Figure 1 is a side elevationa of a tractor showing the invention applied thereto;

Figure 4 is an isometric view of the wheel support frame removed from the tractor but showing the front axle of the tractor in association therewith;

Figure 5 is an enlarged isometric view with parts in section, taken substantially along the line 5—5 in Figure 4 and showing the manner in which the wheel support frame is connected to one end of the front axle of the tractor, the other end of the axle being connected to the wheel support frame in an identical but opposite hand manner.

Figure 1:
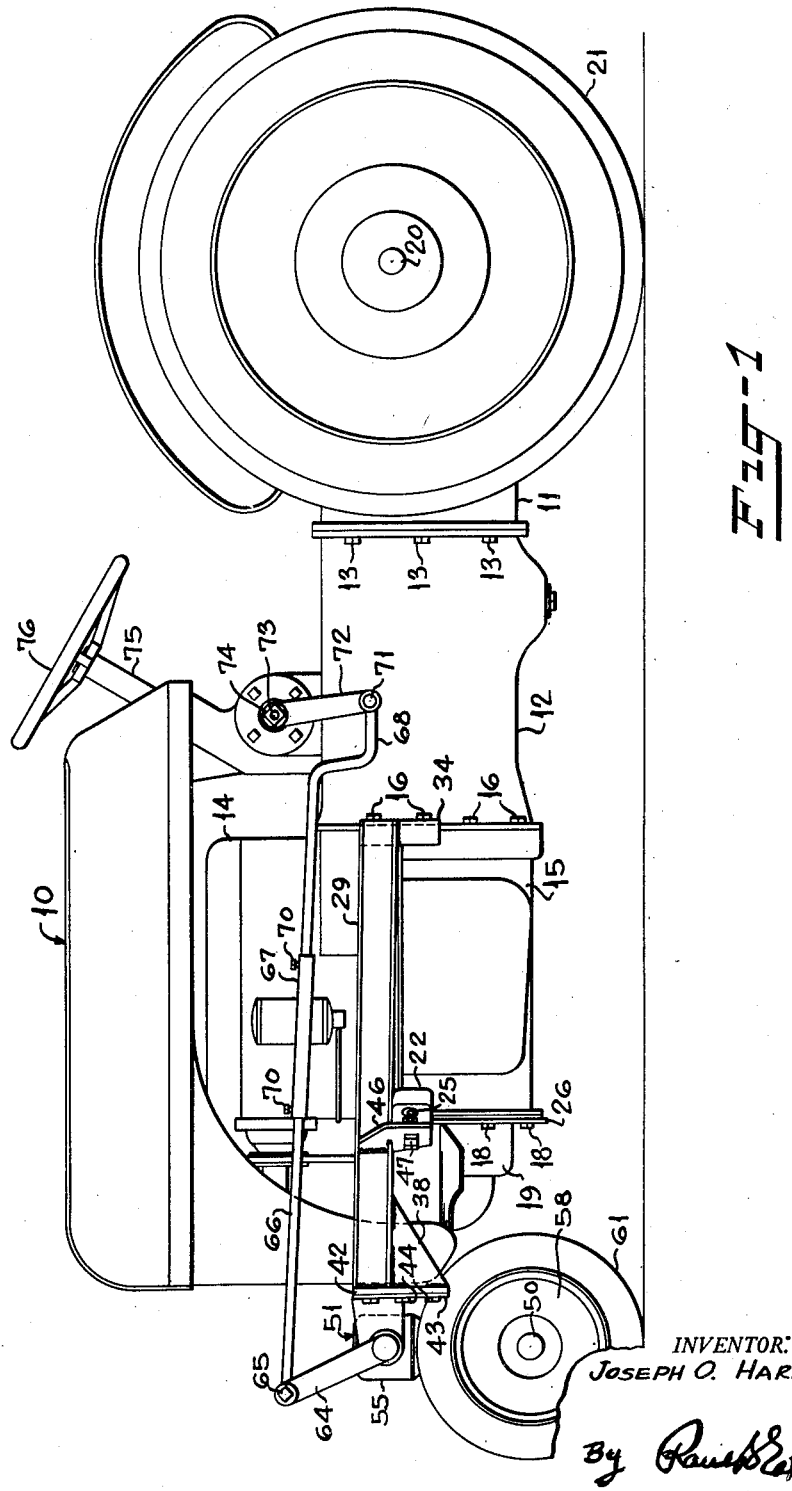

Referring more specifically to the drawings, the numeral 10 broadly designates a conventional tractor having a conventional chassis comprising a rear axle housing 11 secured to a conventional transmission housing 12, as by bolts 13, and an engine assembly 14 and an oil pan 15 suitably secured to the front end of the transmission housing 12 as by bolts 16. Secured to the front end of the oil pan 15 and engine 14 by bolts 18 is a crank shaft support 19. Conventional rear axles 20 are mounted in the extensions 20' of the axle housing 11 and have conventional rear wheels 21 mounted thereon.

Figure 2:
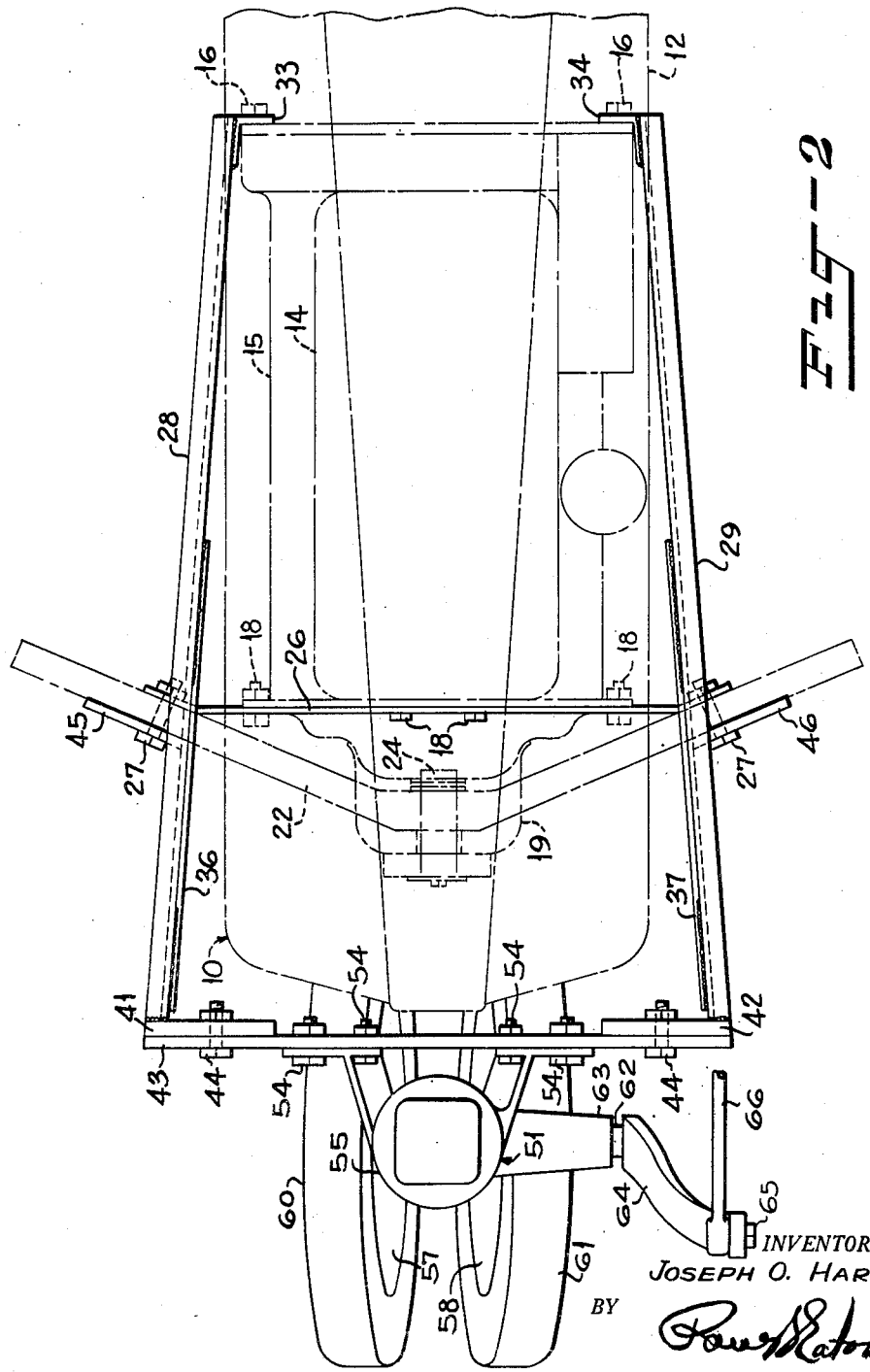
Figure 2 is an enlarged top plan view of the structure shown in Figure 1, the front portion of the tractor being shown in dash and dot lines.

Referring to Figures 2 and 4, it will be observed that the tractor 10 has a front axle 22 having a hole 23 therein which is penetrated by a pin 24 in a conventional manner. The front axle 22 diverges outwardly and rearwardly on each side of the tractor and has a plurality of bores 25 extending through each end portion thereof. Usually, suitable front wheels, not shown, are secured to the ends of the axle by suitable bolts penetrating the bores 25 of the axle 22.

In the present invention, these widely spaced wheels are removed and a frame is provided for mounting a wheel assembly having two front wheels spaced closely adjacent each other on the front of the tractor. The diverging ends of the axle 22 will thus be left free so that suitable earth working implements such as cultivators may be attached to the ends of the axle 22.

Figure 3:
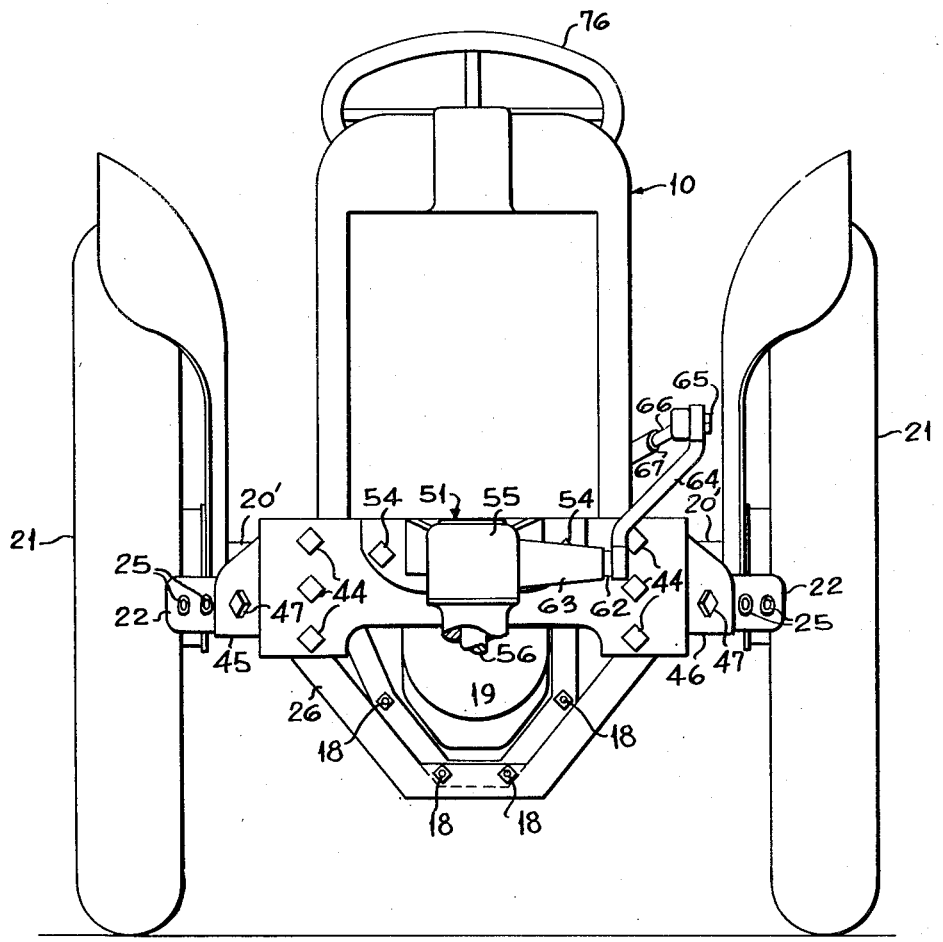
Figure 3 is a front elevation of the tractor showing the wheel support frame in association therewith and with parts of the front wheel assembly being broken away for purposes of clarity.

Referring to Figures 3 and 4, it will be seen that I have provided a U-shaped bar 26 having its medial portion secured to the front end of the oil pan 15 by two of the conventional bolts 18 which secure the oil pan 15 and the crank shaft support 19 together. The upper ends of this U-shaped bar 26 are secured to the axle 22 at two points remote from the ends of the axle 22 by any suitable means such as bolts 27 which penetrate suitable ones of the several bores 25 which are in the ends of the axle 22 and which have heretofore been used for securing the conventional front wheel assemblies thereto. The U-shaped bar 26 is secured to the oil pan 15, in the manner just described, to secure the axle 22 against pivotal movement and to assist in securing the wheel support frame, about to be described, against longitudinal or transverse movement relative to the tractor, and to prevent vertical movement of the front wheel support frame.

The wheel support frame for the front wheel assembly comprises bars, such as channel bars 28 and 29 horizontally disposed one on each side of the tractor and which are secured at their rear ends to the tractor at the juncture of the oil pan 15 and the transmission housing 12 by means of angle plates 33 and 34 being welded to the proximate sides thereof and secured in position by a pair of the conventional bolts 16, penetrating bores 35 in the angle plates 33 and 34. The channel bars 28 and 29 have reinforcing plates 36 and 37 welded to the proximate sides thereof at their front portions. The channel bars 28 and 29 each have downwardly diverging plate members 38 welded to their lower front portions. Welded to the plates 38 and to the front ends of the channel bars 28 and 29 are transversely disposed abutment plates 41 and 42.

A transverse plate 43 is secured to the abutment plates 41 and 42 by bolts 44. The lower edge of the transverse bar 43 is cut away as at 39 to provide sufficient clearance for the front wheels of the tractor to be later described.

Welded to the medial portions of outer sides of the channel bars 28 and 29 are outwardly extending connecting plates 45 and 46 which are penetrated by the bolts 27 which extend through the U-shaped bar 26. The plates 45 and 46 are also penetrated by bolts 47. The bolts 27 and 47 also penetrate the bores 25 in the ends of the axle 22 to secure the plates 45 and 46 and the channel bars 28 and 29 to the front axle 22 of the tractor 10.

By referring to Figure 5 it may be observed that the connecting plates 45 and 46 are of sufficient width to securely connect the channel bars 28 and 29 to the axle 22 and to prevent relative movement therebetween, but these plates do not extend to a point where they will cover all of the bores 25 in the diverging ends of the axle 22, leaving the outermost bores 25 for securing earth working implements to the axle.

It is thus seen that the wheel support frame comprising channel bars 28 and 29 and their associated parts may be mounted on the front end of a conventional tractor in the manner heretofore described and a conventional front wheel assembly, broadly designated at 51, Figures 1, 2 and 3, may be suitably secured, as by bolts 54 to the transverse plate 43 at the front of the tractor by penetrating bores 59 in the plate 43. The wheel assembly 51 comprises a housing 55 which has a conventional vertical shaft 56 therein having a conventional axle 50, secured to the lower end thereof and on which are rotatably mounted two front wheels 57 and 58 having suitable pneumatic tires 60 and 61 thereon. The wheels 57 and 58 are disposed in a conventional manner and are closely adjacent each other.

The housing 55 has therein a beveled gear, not shown, secured on the upper portion of the vertical shaft 56 and a second beveled gear, not shown, meshes with the first beveled gear and is fixed on a horizontally disposed shaft 62 mounted in a sleeve 63 extending from the housing 55. The shaft 62 is connected at its outer end to the lower end of an arm 64 which is pivotally connected as at 65 at its upper end to the front end of a steering rod 66, the rear end of which is telescopically mounted in a sleeve 67. Telescopically mounted in the rear end of the sleeve 67 is the front end of a second steering rod 68. The rods 66 and 68 are adjustably secured in the sleeve 67 by set screws 70. The rear end of the steering rod 68 is pivotally connected as at 71 to the lower end of an arm 72 having its upper end secured to the outer end of a shaft 73, as by a nut 74. The shaft 73 extends inwardly and has a worm gear, not shown, on its inner end, which meshes with a worm, not shown, on the lower end of a steering shaft, not shown, disposed within a conventional steering column 75. The upper end of the steering shaft, not shown, is connected to a conventional steering wheel 76.

It is thus seen that an operator may turn the steering wheel 76 and the front wheels 57 and 58 of the tractor will be turned in a corresponding direction through the linkage just described.

It is thus seen that I have provided a wheel support frame that may be easily secured to the front end of a conventional tractor, having widely spaced front wheels thereon, and a conventional wheel assembly of closely spaced wheels may be secured to the wheel support frame and thus a tractor having widely spaced front wheels may be changed to a tractor having closely spaced front wheels.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a tractor having a chassis provided with rear wheels thereon and having a front axle pivotally mounted on said chassis, said front axle extending outwardly on each side of the tractor, a U-shaped bar connected to said front axle at points remote from the ends of the axle and extending beneath said chassis and connected to said chassis to hold the axle against pivotal movement, a front wheel support frame comprising a pair of bars mounted one on each side of the chassis of the tractor and secured at their rear ends to the chassis and extending forwardly and being secured at their medial portions to the axle and having reinforcing plates on the proximate front portions thereof, said bars having substantially triangular-shaped reinforcing plates secured to the bottom front surface thereof, said bars also having abutment plates secured to the front ends thereof and to the first-named reinforcing plates and the triangularly-shaped reinforcing plates, and a transverse plate secured to the abutment plates, whereby a conventional front wheel assembly having closely spaced front wheels thereon may be mounted on the transverse plate of the wheel support frame.

2. In a tractor having a chassis, rear wheels, and front wheels widely spaced on a front axle having its medial portion pivotally mounted on the chassis, means for mounting closely spaced front wheels on the tractor comprising a bar having one of its ends secured to the axle at a point remote from one of its ends and extending beneath the chassis of the tractor and secured thereto and being connected at its other end to the axle at a point remote from the other end thereof, said bar holding the axle against pivotal movement, a pair of channel bars mounted one on each side of the chassis of the tractor and connected at their rear ends to the chassis of the tractor and extending forwardly and each having a connecting plate secured to the medial portion thereof and means for connecting said connecting plates to the axle, said channel bars having reinforcing plates thereon and having abutment plates secured to the front ends thereof and also secured to the reinforcing plates, a transverse plate connecting the abutment plates, whereby the widely spaced wheels may be removed from the ends of the axle and a wheel assembly having closely spaced front wheels thereon may be mounted on the transverse plate to thus permit earth working implements and the like to be connected to the free ends of the axle.

3. A tractor having a chassis, a front axle pivotally mounted on said chassis, steering means on the tractor, a bar secured to the front axle at points disposed remotely from its pivot point and to the chassis to hold the front axle against pivotal movement, a pair of side bars secured at their ends to the chassis and extending one on each side of the chassis to a point in front of the tractor, said side bars having outwardly diverging connecting plates secured to the medial portions thereof and also secured to the front axle adjacent the chassis of the tractor, a transverse plate secured to the front ends of the side bars, a front wheel assembly having closely spaced front wheels thereon secured to the transverse plate and a steering linkage connecting the front wheel assembly with the steering means on the tractor.

4. A front wheel support frame adapted to be mounted on a conventional tractor having a front axle pivotally mounted thereon, comprising a pair of side bars adapted to extend one on each side of the tractor, means for securing the rear ends of the side bars to the tractor, a transverse bar disposed behind the axle and rigidly secured to the tractor, means for securing a medial portion of the side bars and the ends of the transverse bar to the front axle of the tractor, a transverse plate secured to the front ends of the side bars, and means for securing a front wheel assembly having two closely spaced wheels to the transverse plate of the wheel support frame.

JOSEPH O. HARDIN, Jr.

REFERENCES CITED

The following references are of record in the file of this patent:

UNITED STATES PATENTS

| Number | Name | Date |
|---|---|---|
| 1,614,279 | Carrington | Jan. 11, 1927 |
| 1,868,474 | Strehlow | July 19, 1932 |